United States Patent
By et al.

[11] Patent Number: 5,226,807
[45] Date of Patent: Jul. 13, 1993

[54] PLASTIC MOLDED TORQUE CONVERTER TURBINE

[75] Inventors: Robert R. By, New Baltimore; Theodore E. Hojna, Sterling Heights, both of Mich.

[73] Assignee: General Motors Corporation, Detroit, Mich.

[21] Appl. No.: 914,736

[22] Filed: Jul. 20, 1992

[51] Int. Cl.$^5$ .............................................. F01D 5/30
[52] U.S. Cl. .............................. 416/180; 416/244 R; 403/268
[58] Field of Search .............. 416/180, 244 R, 244 A; 60/330; 403/265, 268, 269, 270

[56] References Cited

U.S. PATENT DOCUMENTS

| | | | |
|---|---|---|---|
| 2,481,541 | 8/1949 | Schneider | 416/180 |
| 3,869,258 | 3/1975 | Scott | 416/180 |
| 4,832,573 | 5/1989 | Dorski | 416/244 R |
| 4,934,138 | 6/1990 | Boyd | 416/244 R |
| 5,037,272 | 8/1991 | By | 416/180 |

*Primary Examiner*—Edward K. Look
*Assistant Examiner*—Michael S. Lee
*Attorney, Agent, or Firm*—Kevin M. Hinman

[57] ABSTRACT

A torque converter turbine has a plastic bladed element molded around a sintered iron hub to form a substantially semi-toroidal structure. The hub provides ribs, apertures through the hub, and channels in which the plastic bladed element is disposed. Having the bladed element and hub thus engaged allows the bladed element and hub to sustain high torsional and axial loads at elevated temperatures without separating.

10 Claims, 5 Drawing Sheets

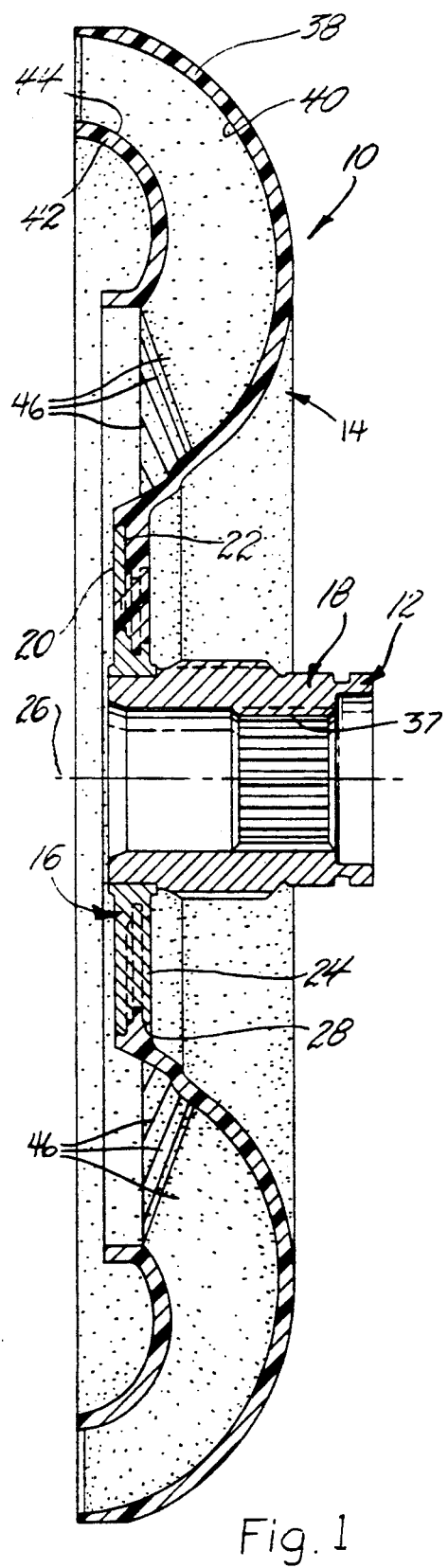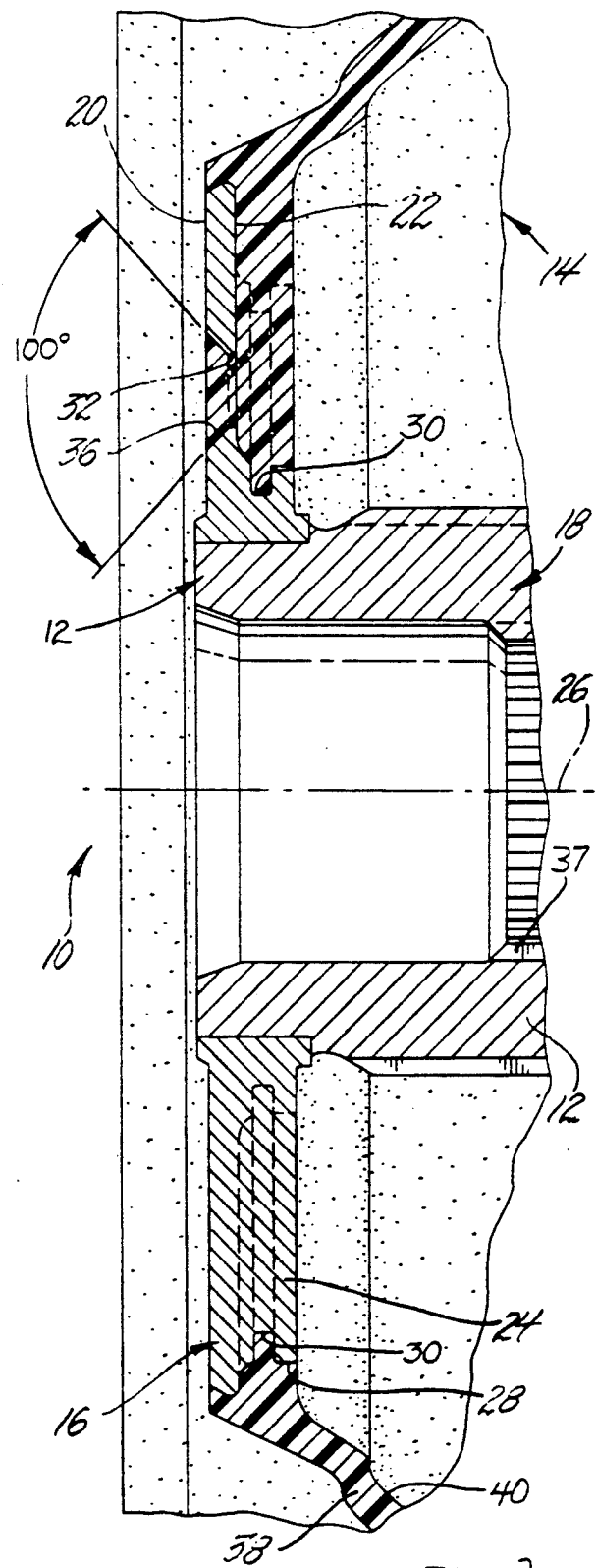
Fig. 1
Fig. 2

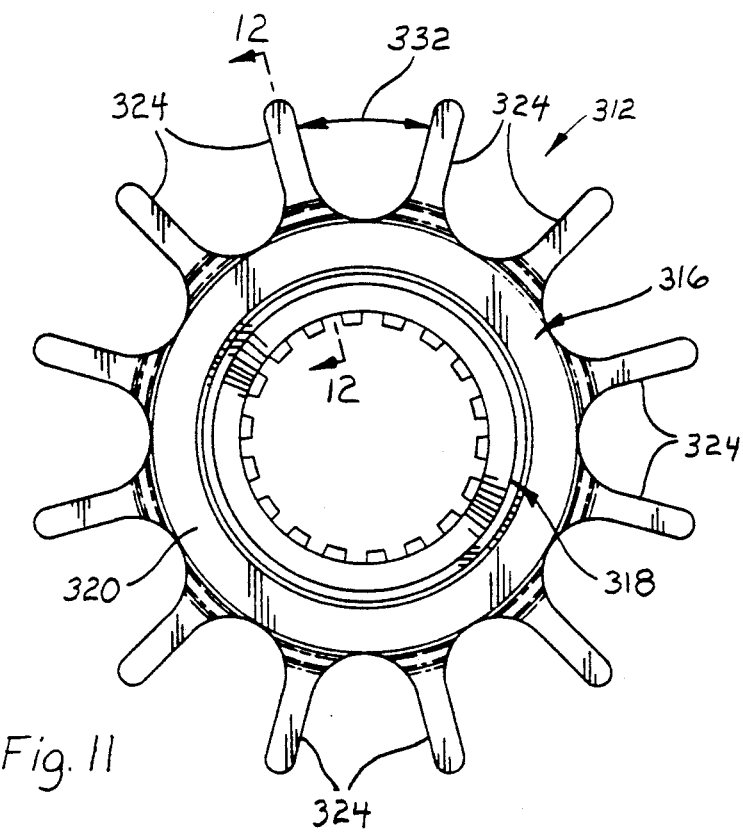
Fig. 11
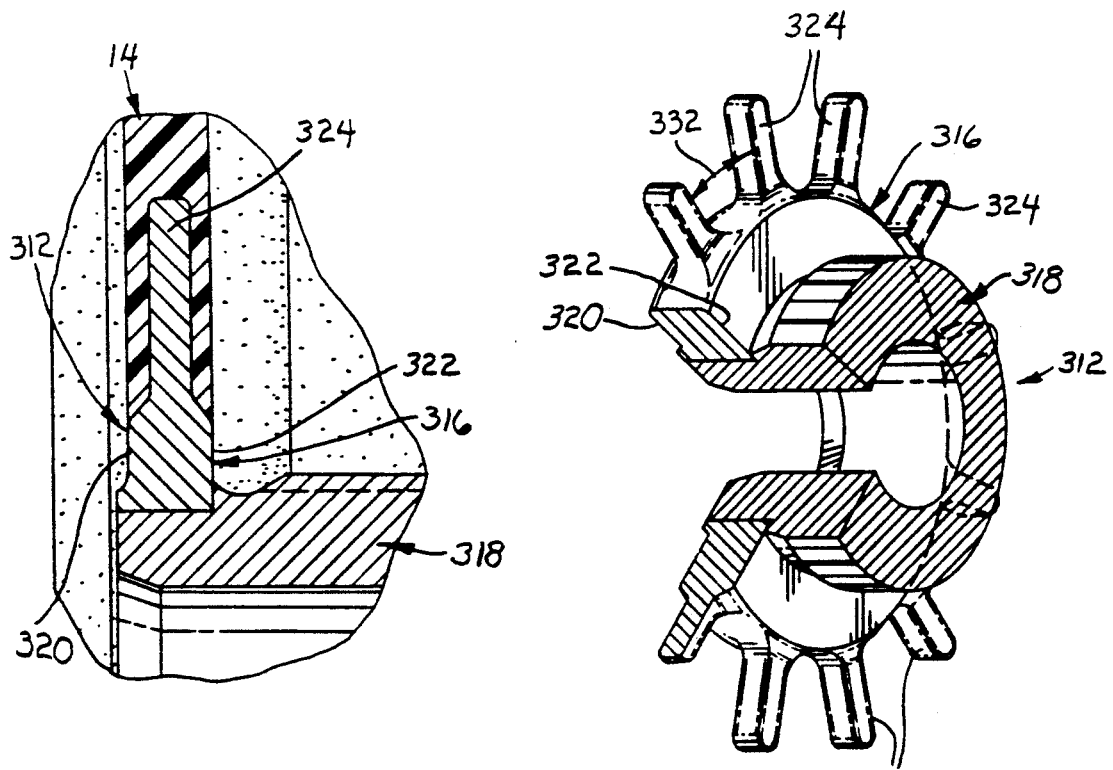
Fig. 12
Fig. 13

PLASTIC MOLDED TORQUE CONVERTER TURBINE

TECHNICAL FIELD

This invention relates to torque converters disposed between a motor vehicle engine and a motor vehicle transmission. More particularly, this invention relates to turbines within such torque converters.

BACKGROUND OF THE INVENTION

Conventional torque converter turbines are typically assembled from stamped pieces. The torque converter turbine shell, turbine core and turbine blades are stamped separately from one another. The blades have tabs on opposing edges. The tabs on a first edge are inserted into corresponding perforations in the shell. The core is then placed over the tabs on the second edges of the blades. The tabs passing through both the core and the shell are bent over, locking together the core, the shell and the blades into a single unit.

Turbines formed in this manner have three significant performance restricting limitations. Those limitations are: potential leak paths both between blade edges proximate to the core and the shell, and at the perforations in the shell and the case for the tabs; an inability to provide leading and trailing blade edges with desired radii and to vary the thickness of the blades significantly, effectively limiting the variety of air foil shapes; and high rotative inertia due to their being formed of steel.

Torque converter turbines molded of plastic address all of the aforementioned limitations of stamped turbines. The leak paths are eliminated with the blades, the core and the shell being molded simultaneously. There is much more freedom allowed in the design of airfoil shapes. The inertia of the turbine is significantly reduced.

Attempts have been made in the past to provide a plastic molded turbine in order to obtain the cited advantages. The interior of a torque converter, however is a harsh environment. The turbine is subjected to high levels of axial loading and torsion as well as being subjected to high operating temperatures. Turbines are typically splined to a torque converter output element or a transmission input element, and must transmit driving torque to the vehicle transmission. Plastic and plastic composites containing reinforcing fibers are generally unsuitable for this type of loading condition, so plastic molded turbines typically have been provided with a steel hub having splines for engaging the transmission input element. However, the harshness of the environment within the torque converter has made the joining of the steel hub with the rest of the turbine, a plastic bladed element, difficult. The different coefficients of thermal expansion of the steel and the plastic tend to stress the joint when it is subjected to a large change in temperature, making it difficult to sustain the high axial and torsional loads to which the turbine is subjected.

SUMMARY OF THE INVENTION

This invention provides an improved attachment between a metal turbine hub and a plastic bladed element resulting in an improved plastic torque converter turbine. The design of the turbine hub is very important to the durability of the turbine. The hub of this invention has been provided with a configuration which significantly increases the ability of the turbine to transmit torque to a transmission input shaft within the harsh environment of a torque converter. Turbines incorporating the present invention have exceeded the performance of an equivalent production type stamped turbine when subjected to a torsional cycling test at elevated temperatures.

A turbine incorporating the present invention also provides the sought after advantages of a plastic turbine, those being the elimination of leak paths in the turbine, a wider variety of possible airfoil shapes, and reduced rotative inertia. These results are achieved by providing the hub with a flange portion with projections which accommodate the disposition of a portion of the bladed element between these projections so as to transmit torque between the hub and the bladed element and resist torsional separation of the bladed element from the hub. The hub also accommodates the disposition of portions of the bladed element on opposite sides of the flange portion to resist any axial loads tending to separate the hub from the bladed element.

A first embodiment of the invention provides this resistance to axial and torsional separation by employing a disc shaped flange portion with a plurality of ribs projecting from a side of the flange portion, and apertures through the flange portion located approximately midway between adjacent ribs. Plastic on the side with the ribs tends to sustain the torsional loads. Plastic in the apertures linking plastic disposed on a first side with plastic on a second side tends to sustain the axial loads.

A second embodiment of the invention provides the resistance to axial and torsional separation by employing a disc shaped flange portion with short posts projecting from a side of the flange portion and apertures through the flange portion located approximately midway between adjacent posts. Plastic in the apertures linking plastic disposed on a first side with plastic on a second side tends to sustain the axial loads. Plastic on the side with the posts tends to sustain the torsional loads.

A third embodiment of the invention is similar to the first embodiment, except that the apertures have been expanded to eliminate the rest of the flange portion except for the ribs. This leaves the ribs projecting radially out from the center portion of the hub in a spoke-like fashion. Plastic disposed between the ribs tends to sustain the torsional loads. Plastic between the ribs also connects plastic on the first side of the ribs with plastic on the second side of the ribs, tending to sustain the axial loads.

Key hub design parameters that have been identified particularly for the first embodiment are the rib number, rib height, rib thickness, the section modulus of the portion of the bladed element between the ribs, and the stress concentration factors associated with the rib geometry.

The present invention provides an improved method of connecting the bladed element to the hub. This invention provides an interface between a plastic bladed element and a steel hub with improved durability in a transmission torque converter. This in turn makes available the advantages of the plastic bladed element including: (1) zero leakage between the blade edges, the core and the shell; (2) an ability to mold the blade into desired airfoil shapes; and (3) a reduction in inertia over steel turbines.

It is an object of this invention to provide an improved torque converter turbine with a plastic molded bladed element and a ferrous metal hub having durability at least equal to the durability of a conventional stamped torque converter turbine and having less rotative inertia than a conventional stamped torque converter turbine.

It is another object of this invention to provide an improved turbine disposed within a torque converter having a hub formed of ferrous metal, the hub having a flange portion with a first side and a second side, having a complement of equally spaced ribs on the second side radiating out from a center of the hub in a spokelike fashion, having an undercut in a perimeter around the ribs forming a channel, having an aperture between each of the ribs passing from the first side to the second side of the flange portion, having a recess around each aperture on the first side, the hub having a center portion fixed to and extending from the flange portion and having engaging means for being rotatively fixed to the torque converter output element; the turbine also having a bladed element being semi-toroidal in shape, the bladed element having a shell and a core and a plurality of blades linking the shell with the core; the bladed element being molded around the hub and formed principally of plastic, the bladed element having portions disposed in part between the ribs of the hub and in the associated apertures and recesses of the hub, and also in the channel of the hub, thereby mechanically engaging the hub.

These and other objects and advantages will be more apparent from the following description and drawings.

DESCRIPTION OF THE DRAWINGS

FIG. 1 is a sectional view of a turbine.

FIG. 2 is an enlargement of the central portion of FIG. 1.

FIG. 11 is an axial end view of a twelve-ribbed turbine hub with complete voids between the ribs.

FIG. 12 is an enlarged sectional view in the direction of the arrows 12 in FIG. 11 having the bladed element imposed.

FIG. 13 is a perspective view of a twelve-ribbed hub with complete voids between the ribs having a wedge of the hub broken out.

DESCRIPTION OF THE PREFERRED EMBODIMENT

Figure 3:
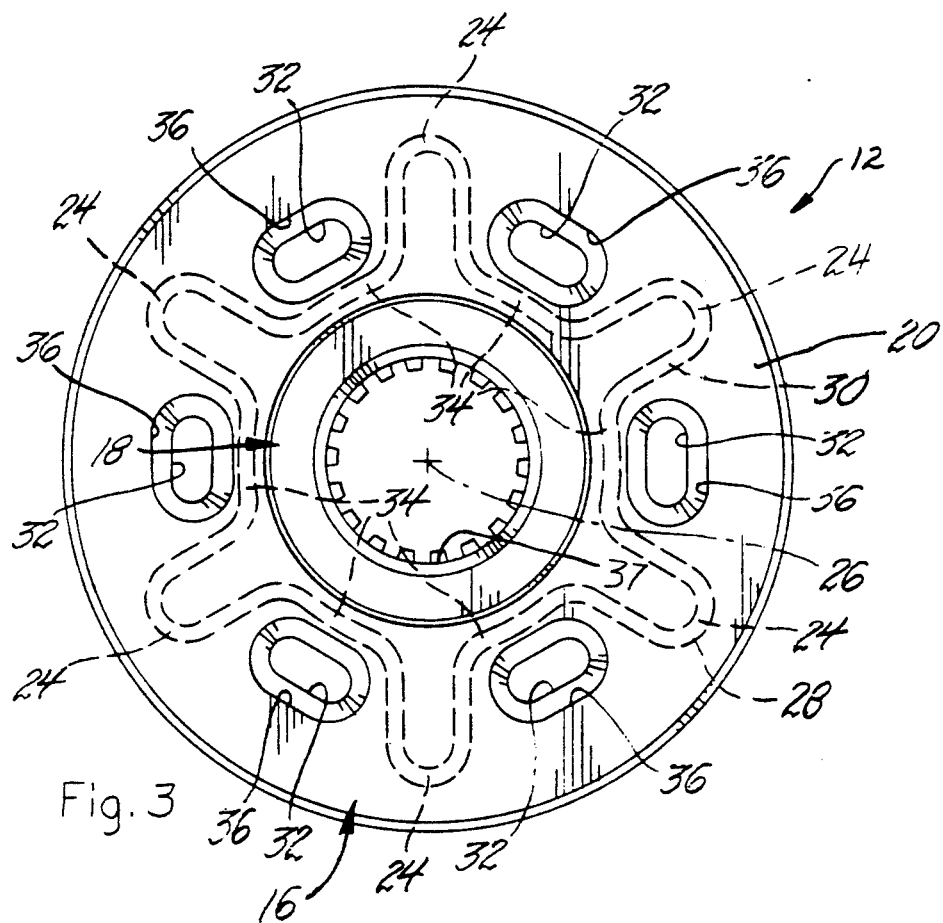
FIG. 3 is an axial end view of a six ribbed turbine hub.
Figure 4:
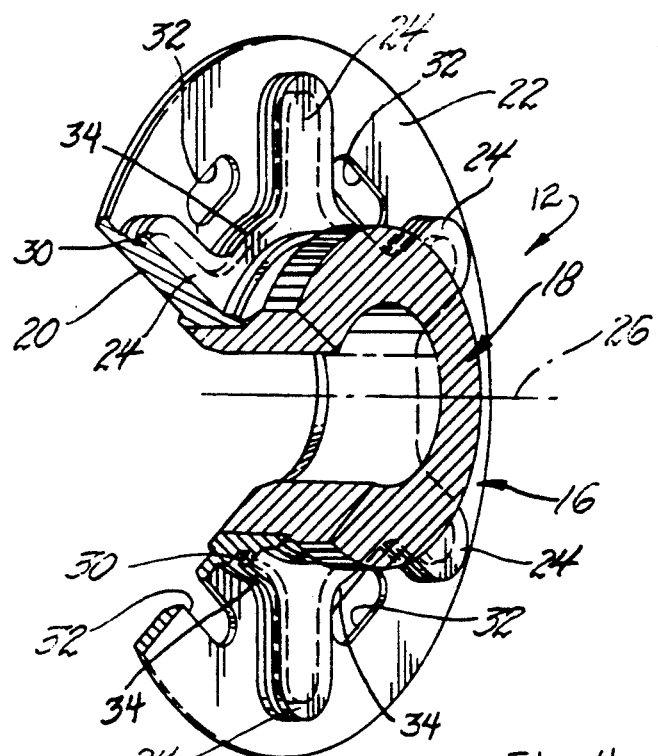
FIG. 4 is a perspective view of a six-ribbed turbine hub with a wedge of the hub broken out.

A torque converter turbine 10 is disposed within a torque converter (not shown). The torque converter is disposed between an engine (not shown) and a transmission (not shown) within a vehicle. The turbine 10 is rotatively fixed to a converter output element (not shown). The turbine 10 has a hub 12 and a bladed element 14. The hub 12 is formed of sintered iron. The hub 12 has a flange portion 16 and a center portion 18. The center portion 18 is formed separately from the flange portion 16 and then joined to the flange portion 16 by electron beam welding.

Alternatively, the hub may be formed as one piece by a powder metal impacting process using powder metal or by a forging process. The bladed element 14 is molded around the hub 12 of a plastic containing reinforcing fibers. The preferred plastic substrate is a polyphenylene sulfide resin which is a thermal plastic material. Ryton R4XT from the Phillips 66 Company or an equivalent is well suited to this use.

The flange portion 16 of the hub 12 is generally disc shaped with a first side 20 and a second side 22. There are six equally spaced projections in the form of ribs 24 protruding from the second side 22. The ribs 24 radiate out from a center 26 of the hub 12 in a spokelike fashion. A continuous curvilinear perimeter 28 circumscribes the ribs 24. The entire perimeter 28 has a single undercut forming a continuous channel 30. The undercut may optionally be omitted.

The flange portion 16 also has six voids in the form of apertures 32 passing from the first side 20 to the second side 22. Each aperture 32 is generally centered between a pair of adjacent ribs 24 near a valley 34 of the perimeter 28. The apertures 32 are elongated, or kidney shaped. Each aperture 32 has a recess 36 uniformly surrounding that aperture on the first side 20 of the flange portion 16. The recesses 36 have a 100° included angle tapering to the apertures 32.

The center portion of the hub 18 is fixed to and axially extends from the flange portion 16. The center portion has splines 37 providing engaging means which engage complementary splines on the torque converter output element (not shown).

The bladed element 14 is semi-toroidal in shape. The bladed element 14 has a shell 38 with a concave surface 40, a core 42 with a convex surface 44, and a plurality of blades 46 linking the concave shell surface 40 with the convex core surface 44. The bladed element 14 has portions disposed between and around the ribs 24 of the hub 12, within the apertures 32 and the associated recesses 36 of the hub 12, and in the channels 30 of the perimeter 28. The plastic in the recesses is effectively disposed on the second side 22 of the flange portion 16. Having the plastic thus disposed through the hub 12 mechanically engages the bladed element 14 with the hub 12.

The portions of the bladed element 14 disposed between the ribs 24 principally aid in the transmission of torque between the bladed element and the hub. The portions of the bladed element disposed in the apertures 32 and the recesses 36 of the hub 12 principally aid in the axial retention of the bladed element 14 to the hub 12. The portion of the bladed element 14 disposed in the channel 30 aids in the transmission of both torque and the axial forces between the hub 12 and the bladed element 14. The perimeter 28 of the hub 12 may additionally be knurled (not shown) to provide an improved mechanical engagement between the hub 12 and the bladed element 14.

Figure 5:
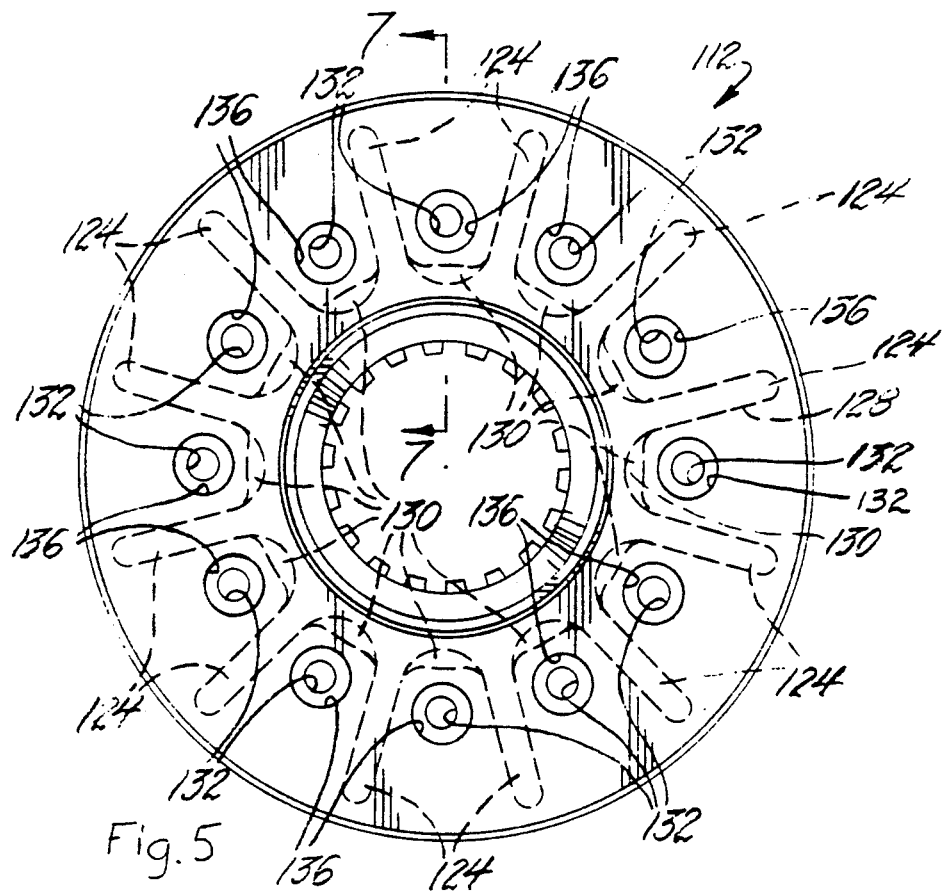
FIG. 5 is an axial end view of a twelve-ribbed hub.
Figures 6, 7:
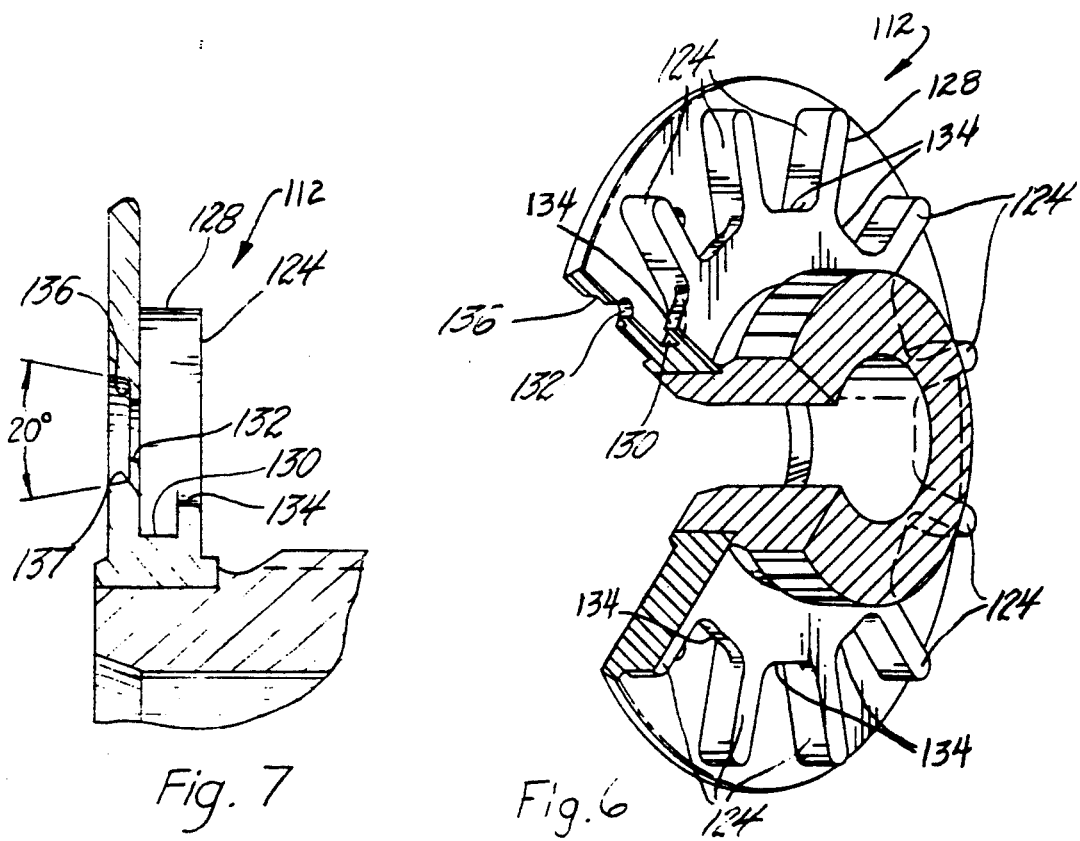
FIG. 6 is a perspective view of a twelve-ribbed hub with a wedge of the hub broken out.
FIG. 7 is an enlarged sectional view in the direction of the Arrows 7 in FIG. 5.

A variation of this ribbed flange configuration of the hub 112, shown in FIGS. 5, 6 and 7, provides twelve ribs 124 instead of six, with twelve apertures 132, one between each pair of adjacent ribs 124. The apertures 132 are circular in shape. Associated recesses 136 resemble a counterbore with a radiused corner and an included angle of approximately 20°. A perimeter 128 is undercut only at valleys 134 to provide twelve small channels 130. The perimeter 128 may optionally be omitted.

The optimum number of ribs is from six to twelve with the number selected being principally dependent on a section modulus of a space between the ribs, stress concentration factors associated with the rib geometry, and design for manufacturing considerations.

Figure 8:
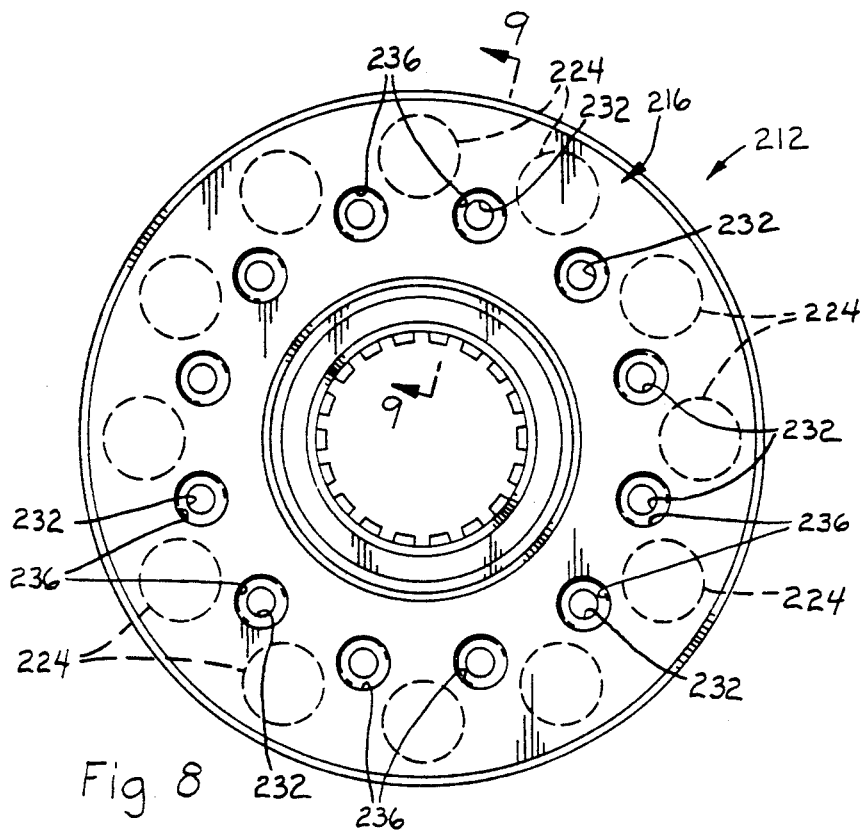
FIG. 8 is an axial end view of a twelve post turbine hub.
Figures 9, 10:
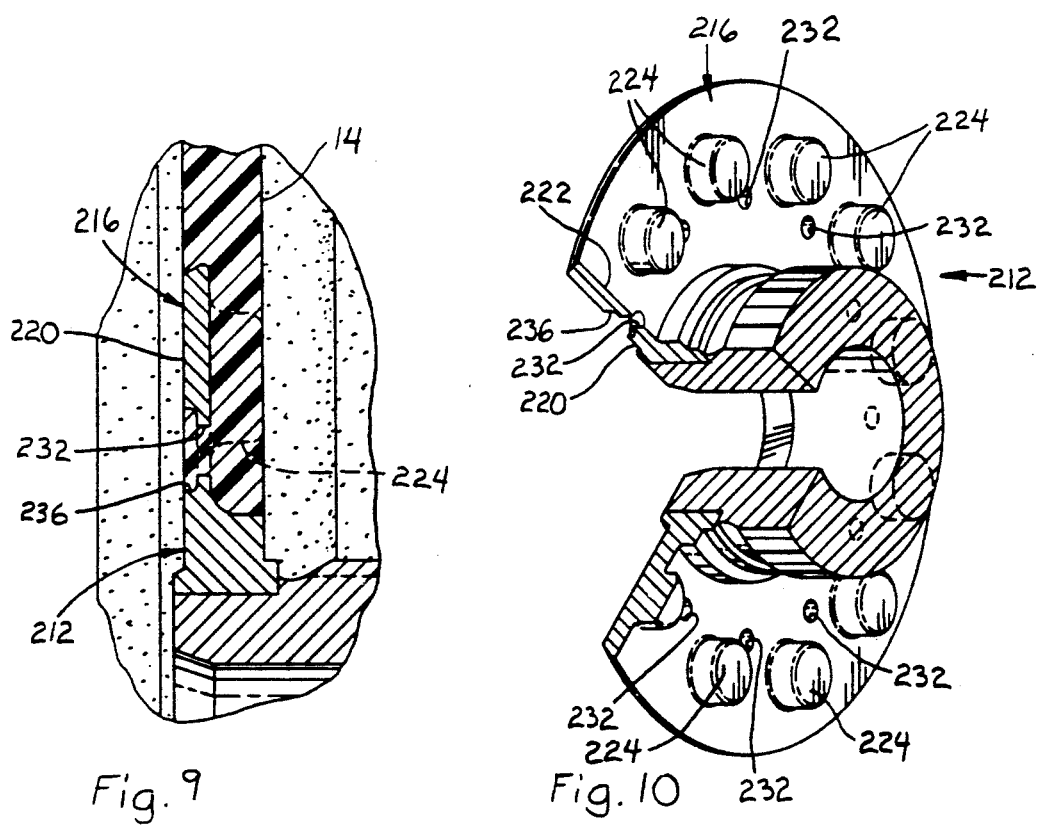
FIG. 9 is a an enlarged sectional view in the direction of the Arrows 9 in FIG. 8 having the bladed element imposed.
FIG. 10 is a perspective view of a twelve post hub with a wedge of the hub broken out.

A second embodiment of the hub 212, shown in FIGS. 8–10, has a disc shaped flange portion 216 with short posts 224 projecting from a second side 222 of the flange portion 216 and apertures 232 through the flange portion 216 located approximately midway between adjacent posts 224. A portion of the bladed element 14 disposed in the apertures 232 links a portion of the bladed element 14 disposed on a first side 220 with a portion of the bladed element 14 on the second side 222, thereby tending to sustain axial loads. Recesses 236 in the first side 220 around the apertures 232 accommodate the disposition of the portion of the bladed element 14 on the first side 220. The portion of the bladed element 14 on the second side 222 found around and between the posts 224 tends to sustain torsional loads.

A third embodiment of the hub 312, shown in FIGS. 11–13, is similar to the twelve-ribbed configuration of the first embodiment of the hub 112, except that the apertures 132 of that configuration have been expanded to much larger voids 332, eliminating that part of the flange portion 316 between the ribs 324. The ribs 324 project radially out from a center portion 318 of the hub 312 in a spoke-like fashion. The bladed element 14 completely encloses the ribs, with portions disposed between the ribs 324 as well as on a first side 320 and a second side 322 of the flange portion 316. The portion of the bladed element 14 disposed between the ribs 324 tends to sustain torsional loads. The portion of the bladed element 14 between the ribs 324 also connects the portion of the bladed element 14 on the first side of the flange portion 316 with the portion of the bladed element 14 on the second side of the flange portion 316, tending to sustain axial loads.

Performance tests conducted with plastic turbines embodying the present invention have shown an improvement of about 0.5 miles per gallon in fuel economy and 0.5 seconds in 0 to 60 mph acceleration times. Durability testing, consisting of subjecting turbines to elevated torque levels, elevated axial load levels, and elevated temperatures, was conducted on plastic turbines embodying the disclosed invention. The test results indicate that a plastic turbine will last longer than a steel turbine of near equivalent design. Additionally, the inertia of a plastic turbine is 54% less than that of an equivalent stamped steel turbine.

Obviously, many modifications and variations of the present invention are possible in light of the above teaching. It is therefore to be understood, that within the scope of the appended claims, the invention may be practiced otherwise than as specifically described.

The embodiments of the invention in which an exclusive property or privilege is claimed are defined as follows:

1. A turbine disposed within a torque converter, the torque converter disposed between an engine and a transmission within a vehicle, the turbine rotatively fixed to a converter output element, the turbine comprising:
   a hub, formed of ferrous material, including:
   a flange portion, having a first side and a second side, having a complement of projections protruding from the second side, the projections being distributed generally evenly about a center of the hub, the flange portion having a void between each pair of adjacent projections, and
   a center portion being fixed to and axially extending from the flange portion, having engaging means for being rotatively fixed to the torque converter output element; and
   a bladed element, semi-toroidal in shape, having a shell with a concave surface, a core with a convex surface, and a plurality of blades linking the concave shell surface with the convex core surface, the bladed element being molded around the hub, being formed substantially of plastic, having portions disposed between and around the projections of the hub and within the voids and on both sides of the flange portion, thereby mechanically engaging the hub, the portion of the bladed element disposed between the projections substantially aiding in the transmission of torque between the bladed element and the hub, and the portion of the bladed element disposed in the voids connecting the portion on the first side of the flange portion with the portion on the second side of the flange portion to aid axial retention of the bladed element to the hub.

2. A turbine disposed within a torque converter, the torque converter disposed between an engine and a transmission within a vehicle, the turbine rotatively fixed to a converter output element, the turbine comprising:
   a hub, formed of ferrous material, including:
      a flange portion, being generally disc shaped, having a first side and a second side, having a complement of projections protruding from the second side, the projections being distributed generally evenly about a center of the hub, the flange portion having a complement of apertures passing from the first side to the second side with each of the apertures generally between each pair of adjacent projections, and
      a center portion being fixed to and axially extending from the flange portion, having engaging means for being rotatively fixed to the torque converter output element; and
   a bladed element, semi-toroidal in shape, having a shell with a concave surface, a core with a convex surface, and a plurality of blades linking the concave shell surface with the convex core surface, the bladed element being molded around the hub, being formed substantially of plastic, having portions disposed on a first side of the hub between and around the projections of the hub, and within the apertures, and on the second side of the hub, thereby mechanically engaging the hub, the portion of the bladed element disposed between the projections substantially aiding in the transmission of torque between the bladed element and the hub, and the portion of the bladed element disposed in the apertures substantially aiding axial retention of the bladed element to the hub by linking the portion disposed on the first side of the hub with the portion disposed on the second side of the hub.

3. A turbine disposed within a torque converter as claimed in claim 2, the turbine further comprising:
   the projections from the hub being provided by a complement of ribs, the ribs radiating out from the center of the hub in a spoke-like fashion, having a single continuous curvilinear perimeter circumscribing the ribs; and the hub having the apertures generally centered between each pair of adjacent ribs near a valley of the perimeter.

4. A turbine disposed within a torque converter as claimed in claim 3, the turbine further comprising:

the hub having recesses uniformly surrounding the apertures on the first side of the flange portion.

5. A turbine disposed within a torque converter as claimed in claim 2, the turbine further comprising:

the projections from the hub being provided by a complement of posts, the posts being generally the same distance from the center of the hub, the hub having the apertures generally the same distance from the center of the hub, and generally at a distance from the center of the hub less than the distance of the posts from the center of the hub.

6. A turbine disposed within a torque converter as claimed in claim 5, the turbine further comprising:

the hub having recesses uniformly surrounding the apertures on the first side of the flange portion.

7. A turbine disposed within a torque converter as claimed in claim 3, the turbine further comprising:

the hub with the complement of ribs being from six to twelve in number, with the complement of apertures and recesses equaling the complement of ribs in quantity.

8. A turbine disposed within a torque converter as claimed in claim 7, further comprising:

the perimeter having an undercut forming a channel, a portion of the bladed element being disposed in the channel in the perimeter, and the portion of the bladed element disposed in the channel aiding in the transmission of both torque and axial forces between the hub and the bladed element.

9. A turbine disposed within a torque converter as claimed in claim 8, the turbine further comprising:

the hub with the complement of ribs being six in number, the channel in the perimeter being of generally constant depth for the entire perimeter, the number of apertures and recesses being six, the apertures having a kidney shape, the recesses having an approximately 100° included angle tapering to the apertures.

10. A turbine disposed within a torque converter as claimed in claim 8, the turbine further comprising:

the hub with the complement of ribs being twelve in number, the channel in the perimeter being at the valley of the perimeter, the number of apertures and recesses being twelve, the apertures being circular in shape with the recess resembling a counterbore with a radiused corner and an included angle of approximately 20°.

* * * * *